United States Patent Office 2,859,115
Patented Nov. 4, 1958

2,859,115

NUTRIENT FOOD PRODUCTS AND PROCESS OF PRODUCING SAME

Eugene Joel Rivoche, Washington, D. C.

No Drawing. Application July 7, 1953
Serial No. 366,637

9 Claims. (Cl. 99—28)

This invention relates to new types of liquid foods and to processes for producing such foods and more particularly relates to new drinks of the shake-type, such as new types of milk shakes, and to new types of soups.

In the past when hydrophilic colloids, such as algins, pectins, agar-agar, etc., were added to milk in order to obtain a smooth viscous mixture, the dry food particles, such as chocolates or other food powders, were suspended in a dry state in the liquid. Although such mixtures originally possess the desired texture and viscosity, they are inherently unstable because of the fact that the small divided food particles are insoluble in the liquid and are for the most part of a heavier specific weight than the liquid. Because of this difference in specific weights and because of differences in the tensions and frictions of the food molecules as compared to those of the liquid molecules, the food powder has tended to settle rather rapidly through the milk to collect or precipitate on the bottom.

All previous attempts at producing a "fruit juice milk shake" wherein the sour juice of a desired fruit was added to the milk have either resulted in curdling of the milk under the action of the acid in the fruit juice, or else have resulted in the extremely diluted milk which obtains on mixing with milk a sufficient volume of diluted fruit juice to yield the desired taste without presenting sufficient acid to cause curdling.

It is an object of this invention to produce, by means of a new process, a drink of the shake-type having an extremely high stability.

It is a further object of this invention to produce by means of a new process a new drink of the shake-type having completely new taste characteristics from those known heretofore.

It is a further object of this invention to produce by means of a new process a fruit juice shake having both a high acidity and a high degree of stability.

It is a still further object of this invention to produce by means of a new process a new nutrient drink of the shake-type having suspended therein a wide variety of food ingredients.

It is a still further object of this invention to produce by means of a new process a new type of soup of high consistency.

It is another object of this invention to produce by means of a new process a new type of soup containing organoleptically perceptible gel particles.

It is a further object of this invention to produce discrete gel particles by means of a new process.

According to the process of this invention the new type of nutrient drinks are prepared by either stirring into milk or other suitable liquid a prefabricated gel having the desired food particles embodied therein, or by stirring into the milk a powder compound containing both the desired food particles and a gelatinization agent which will cause the gelatinization of the milk. The prefabricated gel or the gelled milk is then broken up by means of the stirrer to form a fluid of any desired viscosity. The quality of the gel is dependent upon the concentration of colloid and gelatinization agent, while the fineness of gel particle sizes in the drink is dependent upon the speed, duration and type of mixing utilized. A further means of preparing such new type drinks is to stir into the milk or other suitable liquid a prefabricated gel which contains a surplus of gelatinization agent which transforms the milk or corresponding liquid into a gel which is subsequently broken up by the stirrer.

The drinks prepared in this manner differ markedly from drinks known heretofore. The stability is much better, the mixture has more body to it and has an entirely different and new structure which produces a new taste sensation. When utilizing the new method, the solid food particles are not freely suspended in a dry state in the liquid but are embodied in a gel structure which is generally of a much larger size than the food particles themselves and which possesses entirely different tensions and frictions than the food particles. The specific weight and tensions of the small food particles exercise much less influence upon the settling rate and the drinks produced are therefore much more stable. The size of the gel particles is easily controlled through control of the time, speed, and type of mixer employed and through such control it is possible to produce drinks having a wide variety of entirely new tastes. The method of preparation of the gels and the gelatinization agents used are not critical except in those situations where it is desirable to produce gels which are resistant to both freezing and boiling temperatures and also in those situations where it is desirable to produce milk shakes containing any appreciable concentration of acid. Whereas known methods of preparing such gels might be utilized, it has been found convenient and time-saving to utilize the continuous rapid gel formation processes outlined in my co-pending application No. 307,217, filed August 30, 1952, now U. S. Patent No. 2,791,508, granted May 7, 1957. According to these processes, a gel may be formed by uniformly dispersing a food powder, such as chocolate, a suitable colloid, such as an algin or pectin, and an insoluble salt of an edible alkaline earth metal, such as calcium carbonate, in water and subsequently uniformly distributing throughout this mixture a dry acid powder, such as tartaric acid, which solubilizes the salt to cause immediate institution of gel formation. The type of gel formed is easily controlled through variation of the amount of colloid and calcium carbonate or similar salt utilized. According to a further process disclosed in the same application and also in my application No. 329,795, filed January 6, 1953, now U. S. Patent No. 2,786,763, granted March 26, 1957, a suitable colloid and a passenger buffer are uniformly dispersed in water to form a colloidal solution. Into this colloidal solution is introduced any suitable soluble salt, such as calcium lactate, precipitated calcium sulphate, or calcium phosphate, intermixed with the desired food powder. Upon intermixing the soluble calcium salt and the colloid solution, gelatinization is immediately instituted and proceeds at a rate determined by the temperature and by the nature and amount of the passenger buffer utilized. Here again, the type of gel formed may be controlled through the amount of colloid and salt utilized.

The term "algin" as used herein refers to any of the well-known, commercially available water-soluble algin products, such as alginate of ammonium, magnesium, potassium, sodium and other alkali metals.

Where the colloid used is an algin or pectin, the mixture is converted by the action of alkaline earth metal ions from a thixotropic semi-gel to a firm, advanced gel resistant to higher temperatures. Such heat-resistant gels are also known to the art as heat-irreversible gels.

By the term "semi-gel" is meant a water solution which forms a transparent, highly viscous, elastic, thixotropic mass that is more or less fluid when agitated, which becomes solid upon standing and which, if broken up, will reform upon further standing. By the terms "advanced gel" or "coagulum" is meant a firm, rigid, but relatively brittle gel structure which cannot be forced through or extruded from a small opening or narrow slit as a continuous film. It is broken up by agitation and stirring and will not coalesce and reform upon standing. An advanced gel may be readily cut into pieces with shiny surfaces which do not tend to stick one to the other. It is opaque and subject to syneresis, that is, to the separation of water without loss of form or shape. In other words, an advanced gel will eliminate water without loss of gel structure.

According to a still further process disclosed in my application No. 307,217 and which is particularly adapted to the preparation of soups or the like products, the advanced gelatinization is brought about through a heating or cooking step. In this embodiment a water colloid solution containing the desired foodstuff, solid or liquid, and an insoluble salt of an edible alkaline earth metal is prepared. Into this solution is introduced an acid or a mixture of acids which will solubilize a small amount of the salt at room temperature in order to lend the proper consistency, and which will further completely solubilize the salt when the mixture is heated. One manner of accomplishing this is to introduce into the colloid solution a mixture of a small amount of an acid soluble at room temperatures with a larger amount of an acid insoluble at room temperatures but soluble at high temperatures. As an example, a mixture of citric acid and potassium bitartrate may be used. The citric acid will solubilize enough salt to create the desired semi-gel-like consistency at room temperature whereas the potassium bitartrate will solubilize the remaining salt at high temperature and institute advanced gel formation.

Another manner of accomplishing the desired result is through the use of a salt which is very slightly soluble at both room and high temperatures. Such a salt is added to the colloid solution along with the acid which is soluble only at high temperature. A suitable mixture, for example, may be calcium phosphate and potassium bitartrate. The calcium phosphate will dissolve sufficiently in the cold liquid to give the desired semi-gel-like consistency while the potassium bitartrate will dissolve at high temperatures solubilizing the calcium phosphate and instituting the formation of an advanced gel.

While it has been stated that the manner of gel formation is not critical, it is to be understood that if a heat resistant gel is desired, it is necessary to use either one of the processes of gel formation disclosed in my aforementioned copending application wherein a salt of an edible alkaline earth metal is utilized as the gelatinization agent to form an advanced gel or coagulum as heretofore described or some other process capable of forming a heat resistant gel. Similarly, where it is desired to form a gel resistant to freezing temperatures, that is, a gel which may be frozen immediately after formation and thawed without destruction, it is necessary to use the processes disclosed in my aforementioned copending application wherein a salt of an edible alkaline earth metal is used and the process and gel formation occurs at a temperature between zero and 4° centigrade.

In the formation of the new type of fruit juice shakes, an acid gel is formed by any of several satisfactory processes outlined in my copending application. One satisfactory method is to form a dry mixture of sugar, an insoluble salt of an edible alkaline earth metal such as calcium carbonate, and a colloid such as an algin and to dissolve or suspend this mixture in water at room temperature. This resulting viscous or semi-gel-like substance is then placed in a high speed mixer into which a fruit juice is introduced to institute the formation of an acid gel. If the fruit juice does not produce the desired acidity for gel formation, additional edible acid may be added. It is also possible to use the foregoing process wherein the fruit juice is in a dry powdered form with or without additional dry powdered acid added. These powders are mixed with sugar in order to facilitate uniform dispersal and this powder compound is added to the viscous or semi-gel-like substance in place of the liquid fruit juice of the foregoing process. According to a still further method of producing a satisfactory acid gel, a colloid such as a pectin or algin may be mixed with a suitable salt such as calcium carbonate and a suitable passenger buffer such as trisodium phosphate along with a sugar such as dextrose. This dry mixture is stirred into water until the colloid and dextrose dissolve. Simultaneously, a separate mixture of sugar, tartaric acid, coloring and fruit flavoring are mixed together and this second mixture is then rapidly mixed into the water solution until the sugar dissolves and the viscosity starts to increase. The gel will thereafter form at a high controlled rate.

The acid gel formed in any of the foregoing manners is then introduced into the milk and stirred and broken up therein. Milk characteristically contains a large amount of free calcium ions which will act upon the gel in such a manner as to promote the formation of a coagulum. This action causes acid to be liberated through syneresis and the acid liberated has a tendency to curdle the milk. It has been discovered, however, that if the acid gel utilized is far enough removed from the advanced gel stage when it is introduced into the milk the acid liberation process caused by coagulum formation is a gradual one and will yield a sufficient time interval for preparation and serving of the drink before any appreciable curdling occurs. If it is desired to obtain an even longer life for the drinks, it has been found possible to add buffers either to the milk itself or to the gel in order to insolubilize the calcium ions in the milk and to thus prevent transformation of the gel into a coagulum with the correspondent liberation of acid to produce curdling. This may be done, for example, by adding such buffers as sodium carbonate, sodium acid phosphate or trisodium phosphate. The trisodium phosphate is preferred since it acts very much faster than the other buffers, particularly in cold water or cold milk.

It will be recognized that the types of food ingredients which may be entrapped in the gels of this invention are practically unlimited in variety. On many occasions it is difficult to prefabricate a mixture composed of different types of food products, such as dry products, liquid products, viscous products, farinaceous products, fat products, etc., and still obtain a long shelf or preservation life. These difficulties are readily overcome through the use of the new intermediate step of transforming the preparation into a gel and in such cases the gel might be considered as a convenient packing medium. If even further shelf or preservation life is desired, it is obvious that the addition of suitable preservatives to the gel may be simply and economically accomplished.

Whereas the foregoing processes have all dealt with the introduction into the milk of a prefabricated gel, it is also possible within the scope of this invention to introduce into the milk a powdered mixture which will transform the entire mass of the milk into a gel or coagulum which is subsequently broken up to a liquid or semi-liquid form by stirring. It is further possible to transform the entire milk mass into a gel or coagulum by embodying in the prefabricated gel an excess amount of gelatinization agent so that the liberation of such agent in the milk will cause its gelatinization.

It is also within the scope of the invention to form in the milk, as for example in chocolate milk, a weak gel through the use of a small amount of calcium salt, which may be merely shaken to form a smooth thick drink. In such a case, no cutting stirring action is necessary.

It will be understood that where it has been stated that a given ingredient dissolves or completely dissolves, this refers to dissolution to the extent of its solubility in the particular solvent. Thus, for example, when it is stated that a given acid, such as potassium bitartrate, is insoluble at room temperatures but soluble at high temperatures, it will be understood that the acid is not soluble in unlimited amounts at high temperatures but that reference to a chemical solubility table will give the precise solubilities at both low and high temperatures, the high temperature solubility being many times the low temperature solubility.

It will further be understood that where acid is spoken of as solubilizing salts of alkaline earth metals, such as calcium carbonate, this refers to rendering soluble the alkaline earth ions, such as calcium, which, in the case of calcium carbonate, occurs through a reaction which transforms the insoluble calcium carbonate into soluble calcium bicarbonate.

The following are examples of the foregoing processes:

*Example I.*—A milk drink was prepared using the following materials:

|  | Grams |
|---|---|
| Algin | 1.5 |
| Calcium carbonate | 0.25 |
| Water | 100 |
| Powdered chocolate | 100 |
| Citric acid | 0.4 |
| Milk | 1000 |

1.5 grams of a standard algin of light or medium viscosity was mixed with 0.25 gram of calcium carbonate. 100 grams of water at room temperature were placed in a high speed mixer and the mixture of algin and calcium carbonate added. The mixing was allowed to continue for two to five minutes and while the mixer was still running, a mixture of 100 grams of chocolate powder and 0.4 gram of citric acid was rapidly poured in. The mixer was run for five to ten more seconds and while the mixture was still in a semi-fluid state, it was poured into a container. The semi-fluid mixture formed an advanced gel between two and ten minutes and was then placed in 1000 grams of milk, where it was vigorously stirred to completely cut up and destroy the cohesive nature of the gel and reduce it to small particles.

*Example II.*—A shake-type drink was made using the following materials:

|  | Grams |
|---|---|
| Algin | 1.5 |
| Tetrasodium pyrophosphate | 0.2 |
| Water | 100 |
| Powdered chocolate | 100 |
| Precipitated calcium sulphate | 0.4 |
| Milk | 1000 |

1.5 grams of a standard algin of light or medium viscosity was mixed with 0.2 gram of tetrasodium pyrophosphate. 100 grams of water at room temperature were placed in a high speed mixer and the mixture of algin and tetrasodium pyrophosphate added. The mixing was allowed to continue for two to five minutes and while the mixer was still running, a mixture of 100 grams of powdered chocolate and 0.4 gram of precipitated calcium sulphate were added. The mixer was run for five to ten more seconds and while the mixture was still in a semi-fluid state, it was poured into a container. The semi-fluid mixture formed an advanced gel between two and ten minutes and this gel was placed in a container of 1000 grams of milk. The gel in the milk was then subjected to vigorous stirring action to completely cut up and destroy the cohesive nature of the gel to form a viscous drink of the shake-type.

*Example III.*—A milk drink was made using the following materials:

|  | Grams |
|---|---|
| Algin | 1.0 |
| Trisodium phosphate | 0.5 |
| Calcium carbonate | 0.15 |
| Milk | 100 |
| Citric acid | 0.3 |
| Powdered chocolate | 10 |

1.0 gram of a standard algin of light or medium viscosity was mixed with 0.5 gram of trisodium phosphate and with 0.15 gram of calcium carbonate. 100 grams of milk, at no higher than room temperature, were placed in a high speed mixer and the mixture of algin, trisodium phosphate and calcium carbonate added. The mixing was allowed to continue for two to five minutes and while the mixer was still running, a mixture of 10 grams of powdered chocolate and 0.3 gram of citric acid was rapidly poured in. The mixer was run for five to ten seconds more and while the mixture was still in a semi-fluid state, it was transferred into a container. The semi-fluid mixture formed an advanced gel between two and ten minutes and was then completely cut up and its cohesive nature destroyed by means of a cutter which was operated until a thick shake-type drink was obtained.

*Example IV.*—A milk drink was made using the following materials:

|  | Grams |
|---|---|
| Algin | 1.5 |
| Calcium carbonate | 0.1 |
| Water | 100 |
| Powdered chocolate | 100 |
| Citric acid | 0.18 |
| Potassium bitartrate | 0.3 |
| Milk | 1000 |

1.5 grams of a standard algin of light or medium viscosity was mixed with 0.1 gram of calcium carbonate and this mixture mixed with 100 grams of water at room temperature for two to five minutes. While the mixer was still running, a mixture of 100 grams of powdered chocolate, 0.18 gram of citric acid and 0.3 gram of potassium bitartrate was added and stirred for about ten more seconds. The mixture was then fed to a feed pipe and extruded past the electrodes of a dielectric heater to cause advanced gel formation. The advanced gel was then placed in 1000 grams of milk and the gel completely cut up and its cohesive nature destroyed by mixing until the milk possessed a thick, creamy texture.

*Example V.*—A milk drink was made using the following materials:

|  | Grams |
|---|---|
| Algin | 1.5 |
| Water | 100 |
| Powdered chocolate | 100 |
| Calcium phosphate | 0.3 |
| Potassium bitartrate | 0.3 |
| Milk | 1000 |

1.5 grams of algin were mixed with 100 grams of water at room temperature for about three minutes and while the mixer was still running, a mixture of 100 grams of powdered chocolate, 0.3 gram of calcium phosphate and 0.3 gram of potassium bitartrate were added. The mixer was allowed to run for about ten more seconds and the mixture was then fed to a feed pipe and extruded past the electrodes of a dielectric heater to cause advanced gel formation. The emanating product was then placed in 1000 grams of milk and stirred and mixed until the cohesive nature of the gel was destroyed and a thick, creamy drink was produced.

*Example VI.*—A fruit juice shake was prepared using the following ingredients:

| | | |
|---|---|---|
| Algin | grams | 2.5 |
| Sodium carbonate | do | 0.2 |
| Calcium carbonate | do | 0.2 |
| Sugar | do | 50 |
| Water | do | 180 |
| Fruit juice | cubic centimeters | 70 |
| Citric acid | grams | 3.5 |
| Milk | do | 500 |

2.5 grams of a standard algin of light or medium viscosity was mixed with 0.2 gram of calcium carbonate, 0.2 gram of sodium carbonate and 25 grams of sugar. 100 grams of water at room temperature were placed in a high speed mixer and the mixture of algin, sodium carbonate, calcium carbonate and sugar added. The mixing was allowed to continue for about five minutes and while the mixer was still running, a mixture of 3.5 grams of citric acid, 25 grams of sugar, 70 cc. of fruit juice and 80 grams of water was poured in. The mixer was run for five to ten more seconds and while the mixture was still in a semi-fluid state, it was poured into a container. The semi-fluid mixture formed an advanced gel between two and ten minutes and this gel was then placed in 500 grams of milk and cut up by means of a stirrer to form a thick, fruit juice shake.

*Example VII.*—A fruit juice shake was prepared using the following materials:

| | | |
|---|---|---|
| Algin | grams | 2.0 |
| Calcium carbonate | do | 0.35 |
| Trisodium phosphate | do | 0.3 |
| Glucose | do | 15.0 |
| Sugar | do | 40 |
| Tartaric acid | do | 2.0 |
| Coloring agent | do | .005 |
| Synthetic fruit flavoring | drops | 2 |
| Water | grams | 200 |
| Milk | do | 1000 |

2.0 grams of a standard algin of light or medium viscosity was mixed with 0.35 gram of calcium carbonate, 0.3 gram of trisodium phosphate and 15.0 grams of glucose. 200 grams of water at room temperature were placed in a high speed mixer and the mixture of algin, calcium carbonate, trisodium phosphate and glucose added. The mixing was allowed to continue for two to five minutes. Two drops of a synthetic fruit flavoring and 0.005 gram of a coloring agent were mixed with 40 grams of sugar and into this mixture was introduced 2.0 grams of tartaric acid. The entire homogeneous mixture was then poured into the aforementioned batch at the termination of the two to five minutes of mixing. The mixer was run for five to ten more seconds and while the mixture was still in a semi-fluid state, it was poured into a container. The semi-fluid formed an advanced gel between two and ten minutes and this gel was then reduced to small particles in 1000 grams of milk by means of vigorous stirring.

*Example VIII.*—A soup was made using the following materials:

| | | |
|---|---|---|
| Algin | grams | 1.5 |
| Calcium carbonate | do | 0.25 |
| Canned tomato soup | ounces | 10.5 |
| Citric acid | grams | 0.4 |
| Water | ounces | 10.5 |
| Tetrasodium pyrophosphate | grams | 0.4 |
| Water | do | 20 |

10.5 fluid ounces of a canned tomato soup were diluted with 10.5 ounces of water as per the directions on the can. This mixture was thoroughly mixed and 100 grams of the same drawn off in a separate container. 1.5 grams of a standard algin of light or medium viscosity was mixed with 0.25 gram of calcium carbonate and 0.4 gram of tetrasodium pyrophosphate. The 100 grams of soup mixture at room temperature were placed in a high speed mixer and the mixture of algin and calcium carbonate added. The mixing was allowed to continue for two to five minutes and while the mixer was still running, 0.4 gram of citric acid dissolved in 20 grams of water was rapidly poured in. The mixer was run for five to ten more seconds and while the mixture was still in a semi-fluid state, it was poured into a container. The semi-fluid formed an advanced gel between two and ten minutes and this gel was then placed in a mixing bowl wherein it was completely cut up and its cohesive nature destroyed by means of vigorous stirring action. The thick emulsion-like gel substance was then mixed with the remaining water and soup compound to form a thick, creamy tomato soup.

While the foregoing examples show workable formulas, it is to be understood that variations in amounts of foodstuffs, colloids and gelatinization agents may readily be made in view of the product which it is desired to obtain. Thus, higher or lower food concentrations may be used, as well as gels of a softer or harder nature. The hardness is readily controlled through variations of algin and calcium concentrations and it is also possible to use a wide range of gelatinization agents. It is furthermore possible to vary the timing of any of the foregoing reactions through the use of suitable buffer agents such as trisodium phosphate, tetrasodium pyrophosphate, etc. Whereas the disclosed methods of heat resistant gel formation constitute satisfactory and preferred methods of carrying out the invention, the invention is not limited thereto, and any satisfactory means of forming heat resistant gels may be utilized.

If it is desirable to avoid any acid taste in the final product, it is preferable to use soluble calcium as a gelatinization agent so as to avoid the introduction of acid into the mixture.

While the foregoing processes are adapted to use in the preparation of soups and the like products, it has been found more advantageous and convenient in preparing such products to manufacture the gel in a divided form, that is, in the form of uniform sized droplets or spheres, which may be merely added to the soup without the necessity of a gel cutting operation. Such droplets are prepared by allowing a water colloid solution to slowly drip through a large number of uniform diametered apertures into a bath containing a gelatinization agent of any of the types heretofore mentioned. Thus, for example, a water and algin solution containing the desired flavoring may drip into a calcium lactate bath to cause the formation of spheres of advanced gel which may be removed and packaged in such a state. Alternatively, such gel spheres may be dehydrated, packaged and later mixed with soup by a consumer to reconstitute the original gel. Sphere size may be controlled through variation of aperture diameter, colloid solution viscosity, and hydrostatic head, and by means of such control gel spheres capable of producing widely varying soup taste sensations may be continuously manufactured. As an example, the dry gel grains may be added to existent dry soup preparations to greatly improve their consistency characteristics. One of the primary advantages realized in using such dehydrated gels in dry soup preparations is the ability to mix into the colloid solution normally incompatible ingredients which are encased in the gel as discrete particles which may then be packaged with the remaining dry ingredients. This is particularly advantageous in the preservation of flavor in the prepared soup. While ordinary dried soups have a tendency to lose many of the food flavors during the dehydration process, it has been found that through the use of the intermediate gel step of this invention these flavors are remarkably well preserved.

In addition to gel droplets consisting of a substantially uniform advanced gel throughout, it is also possible, according to the invention, to produce droplets which consist of a semi-gel-like or viscous liquid interior surrounded by an advanced gel pellicle. Such droplets may be formed by allowing a viscous solution, which has been thickened by means other than addition of a colloid, and which contains a gelatinization agent, such as a soluble calcium salt, to drip into a bath comprising a water colloid solution. In such a process, the gelatinization agent on the surface of the droplet reacts with the water colloid to form an advanced gel film around the viscous interior of the drop. Where it is desired to harden the colloid pellicle to produce a different taste sensation, the droplets may be passed through a solidification bath, such as a bath containing a water solution of a soluble salt of an edible alkaline earth metal, or a plasticizer solution such as a 3 to 10 percent solution of glycerine.

By means of these processes, it is possible to introduce into the soup any desired additives, such as flavoring, fats, preservatives, vitamins, minerals, flour or dehydrated powder of the soup, etc., and it is possible to produce a very thick and organoleptically rich soup without the added expense of supplying nutrient thickening ingredients. If the food additives to the colloid, such as soup, cause an excessively viscous solution, the mixture may be warmed to improve the viscosity prior to dropping the mixture into the gelatinization bath.

Following is an example of this facet of the invention:

*Example IX.*—A soup additive was prepared using the following ingredients:

| | |
|---|---|
| Canned tomato soup prepared as per directions _____grams__ | 100 |
| Algin _____do____ | 1.5 |
| Calcium lactate bath_____percent__ | 3 |

1.5 grams of a standard align of light or medium viscosity was added to 100 grams of canned tomato soup which had been prepared according to the directions on the can and the mixture stirred at room temperature for five minutes. This mixture was then poured into a container having a bottom containing a plurality of apertures of a diameter of ⅛ inch and a depth of 5 inches of liquid was maintained as the liquid dropped through. The falling drops were received in a 3% calcium lactate bath located 1½ feet below the aperture where an advanced gel was formed. The gel droplets were then removed.

As with the drink processes, the values given represent a workable formula but not a critical one. Variations may be made to achieve desired taste effects. The colloid concentration preferably ranges from 0.5 to 2.0%, although this is subject to variation to suit individual tastes. The calcium lactate bath preferably ranges between about a 1 to 10% solution, although this, too, is subject to variation. Other edible salts of alkaline earth metals may obviously be used as well as other colloids, than aligns and other satisfactory methods of inducing properly timed gel formation.

If the soups used contain any appreciable amount of free calcium ions suitable buffers may be added to render such calcium ions insoluble. Likewise, if the soups possess a low pH, suitable buffers may be utilized to prevent premature or uncontrolled gel formation.

When it is desired to carry out the formation of such spheres as are formed in Example IX on a continuous basis removal of the spheres may be facilitated by adjusting the specific gravity of the final bath so as to cause the spheres to rise to the surface instead of sinking.

Whereas this invention has been described in terms of specific ingredients and compounds, it will be understood that this has been for the purpose of illustration only and is not to be deemed limiting in any sense, the invention being limited solely by the terms and spirit of the appended claims.

I claim:

1. A process for preparing a food product comprising the steps of homogeneously dispersing food material in a fluid hydrophilic colloid solution which will set to a water-insoluble, irreversible, advanced gel, setting the resulting solution into said water-insoluble, irreversible advanced gel while said food material is homogeneously dispersed therein so as to entrap said food material throughout the gel structure, then homogeneously suspending small organoleptically perceptible particles of the resulting advanced gel in the edible liquid so that the resulting product is a stable suspension of drink consistency containing said food material within the individual suspended gel particles.

2. The method of claim 1 wherein the hydrophilic colloid is an alginate, a buffer salt is included in the gel-forming mixture, and said edible liquid is milk.

3. The method defined in claim 1 wherein the food material incorporated in the gel is chocolate and the edible liquid is milk.

4. The method defined in claim 1 wherein the food material incorporated in the gel is a fruit juice and wherein the edible liquid is milk.

5. The method of claim 1 wherein said advanced gel is broken up into small particles in contact with the suspending liquid.

6. The method of claim 1 wherein said advanced gel is formed into small spherical particles prior to suspension in said edible liquid.

7. A food product of drink consistency produced by the process of claim 1.

8. A chocolate shake produced by the process of claim 3.

9. A fruit juice milk shake produced by the process of claim 4.

References Cited in the file of this patent

UNITED STATES PATENTS

| | | |
|---|---|---|
| 398,915 | Tower | Mar. 5, 1889 |
| 2,258,567 | Epstein et al. | Oct. 7, 1941 |
| 2,403,547 | Peschardt | July 9, 1946 |
| 2,532,281 | Barch | Dec. 5, 1950 |
| 2,536,708 | Angermeier | Jan. 2, 1951 |
| 2,582,353 | Partridge | Jan. 15, 1952 |
| 2,665,211 | Roland | Jan. 5, 1954 |
| 2,665,212 | Roland | Jan. 5, 1954 |
| 2,686,127 | McDowell | Aug. 10, 1954 |

FOREIGN PATENTS

| | | |
|---|---|---|
| 501,065 | Great Britain | Feb. 21, 1939 |